(12) United States Patent
Cellemme et al.

(10) Patent No.: US 7,533,699 B1
(45) Date of Patent: May 19, 2009

(54) END CAP CLAMPING AND SEALING SYSTEM

(75) Inventors: Raymond Eugene Cellemme, Matthews, NC (US); Phillip Theodore Yontz, Rock Hill, SC (US); Jamie Lee Quinlan, Indian Trail, NC (US)

(73) Assignee: Conbraco Industries, Inc., Pageland, SC (US)

( * ) Notice: Subject to any disclaimer, the term of this patent is extended or adjusted under 35 U.S.C. 154(b) by 0 days.

(21) Appl. No.: 12/022,497

(22) Filed: Jan. 30, 2008

(51) Int. Cl.
*F16L 55/10* (2006.01)
(52) U.S. Cl. .......................... 138/89; 138/90; 220/320; 220/321; 215/275; 215/284
(58) Field of Classification Search .................. 138/89, 138/90, 96 R; 220/320, 321; 215/275, 280, 215/284
See application file for complete search history.

(56) References Cited

U.S. PATENT DOCUMENTS

| | | | | |
|---|---|---|---|---|
| 1,033,382 A | * | 7/1912 | Carr | 215/284 |
| 4,015,745 A | * | 4/1977 | Petrangelo | 220/320 |
| 4,936,483 A | * | 6/1990 | Ballu | 220/240 |
| 6,877,633 B2 | * | 4/2005 | Niese | 220/315 |
| 2003/0024936 A1 | * | 2/2003 | Niese | 220/573.1 |

* cited by examiner

*Primary Examiner*—Patrick F Brinson
(74) *Attorney, Agent, or Firm*—Adams Intellectual Property Law, P.A.

(57) ABSTRACT

The present invention provides an end cap sealing system for sealing an open piping end. The end cap sealing system includes an end cap having an end cap core. The end cap core has a generally cylindrical end with a circumferential groove formed around the exterior thereof and a closed end that defines a generally circular rim. An o-ring is positioned within the groove for sealingly engaging an interior wall of the piping open end. The end cap sealing system also includes a generally circular clamp having a channel formed therein for capturing the rim and a flange formed on the check valve. The o-ring being spaced-apart from the rim of the end cap core.

13 Claims, 6 Drawing Sheets

END CAP CLAMPING AND SEALING SYSTEM

BACKGROUND OF THE INVENTION

This invention relates generally to systems for sealing access ports and other openings in piping systems and more particularly to an end cap cover for a check valve assembly where the end cap cover is held in place by a circumferential clamp.

It is known to seal the open ends of piping and ports formed in pipe fixtures using removable caps. In this regard, the end or port can be accessed by removing the cap for replacing the end cap with another fixture or for providing access to a space within the piping of fixture. End caps are used in fixtures such as check valve assemblies for sealing an access port formed in a check valve housing. Generally such end caps are metallic, and a gasket or o-ring for sealing is positioned between a flange formed on the end cap and a flange formed on the check valve assembly.

Conventional end caps are often attached to pipes by engaging retaining rings, clamps, cooperating threaded surfaces formed on the pipe end and on the cap, and the like. In each case the gasket or o-ring for sealing is positioned between the flange of the end cap and the flange of the fixture.

A problem with such known end caps is that in order for the gasket or o-ring to be sealingly engaged, the o-ring must be compressed between the flanges around the entire circumference of the end cap. Such uniform compression can be difficult to obtain. Another problem with known end cap sealing systems is that the end caps are metallic. Metallic end caps can be costly to manufacture and contribute significantly to the weight of the fixture, such as a check valve assembly, in which the end cap is being used.

BRIEF SUMMARY OF THE INVENTION

Accordingly, there is a need to provide an end cap sealing system that is lighter, less costly to manufacture, and more reliably sealed than known end cap sealing systems.

Therefore it is an object of the present invention to provide an end cap sealing system that includes an end cap having polymeric components.

Therefore it is an object of the present invention to provide an end cap sealing system that is lighter in weight than conventional end cap sealing systems.

Therefore it is an object of the present invention to provide a check valve assembly that is lighter in weight than conventional check valve assemblies.

Therefore it is an object of the present invention to provide an end cap sealing assembly having an end cap core that is non metallic.

Therefore it is an object of the present invention to provide an end cap sealing system having a gasket or o-ring for sealing that is spaced-away from flanges formed on an end cap such that the gasket or o-ring can engage an interior surface of the piping end or fixture being sealed.

Therefore there is provided an end cap sealing system for sealing an open piping end. The end cap sealing system includes an end cap having an end cap core. The end cap core has a generally cylindrical end with a circumferential groove formed around the exterior thereof and a closed end that defines a generally circular rim. An o-ring is positioned within the groove for sealingly engaging an interior wall of the piping open end. The end cap sealing system also includes a generally circular clamp having a channel formed therein for capturing the rim and a flange formed on the check valve. The o-ring being spaced-apart from the rim of the end cap core.

In accordance with one embodiment of the present invention, a generally circular clamp having a channel formed therein for capturing the rim and a flange formed on the open piping end is provided.

In accordance with another embodiment of the invention, the open piping end is formed on a fixture.

In accordance with another embodiment of the invention, the fixture is a check valve and the open piping end is an access port.

In accordance with another embodiment of the invention, the flange is formed around the access port and defines a surface that engages the lip of the end cap.

In accordance with another embodiment of the invention, the end cap includes a polymeric end cap core.

In accordance with another embodiment of the invention, a metallic end cap cover is provided.

In accordance with another embodiment of the invention, the end cap cover is attached to the end cap core by a screw.

In accordance with another embodiment of the invention, the end cap cover is attached to the end cap core by a valve having a portion that extends through the end cap core.

In accordance with another embodiment of the invention, there is provided a method for using an end cap sealing system to seal open piping end. A clamp and an end cap having an end cap core are provided. The end cap core has a generally cylindrical end with a circumferential groove formed around the exterior thereof and a closed end that defines a generally circular rim. An o-ring is positioned within the groove for sealingly engaging an interior wall of the open piping end. The end cap sealing system also includes a generally circular clamp having a channel formed therein for capturing the rim and a flange formed on the check valve. The o-ring being spaced-apart from the rim of the end cap core.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
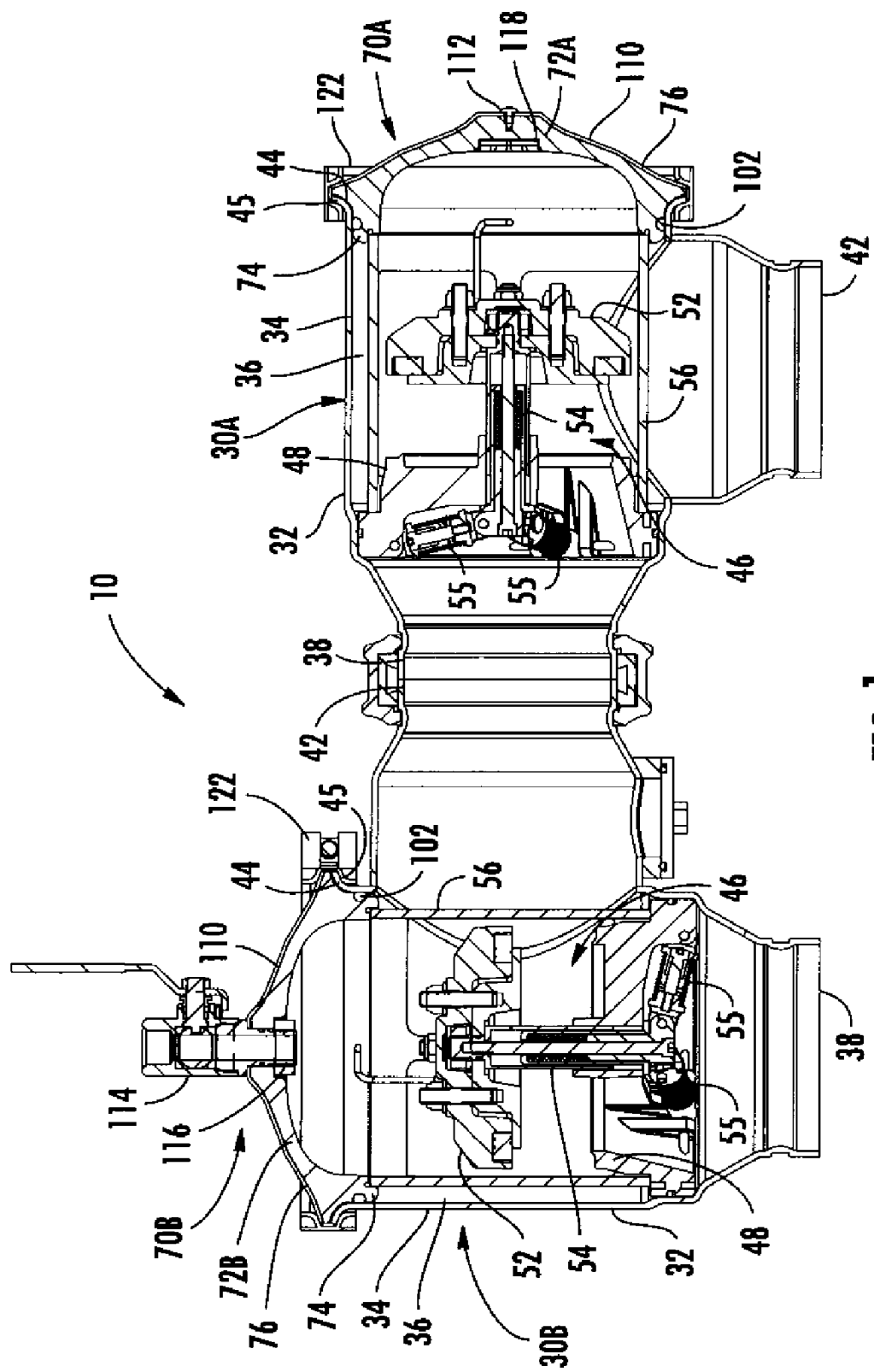
FIG. 1 is a sectional side view of a check valve assembly that includes end cap covers according to one embodiment of the present invention.

Referring to the drawings wherein identical reference numerals denote the same elements throughout the various views, FIG. 1 illustrates a check valve assembly 10 that includes two end caps 70A and 70B according to the present invention. The end caps 70A and 70B are substantially similar such that the end cap 70B can be understood from a description of the end cap 70A with the exception of an alternative configuration described further below.

The check valve assembly 10 includes a pair of check valves 30A and 30B positioned in series with each other. The check valves 30A and 30B are substantially the same such that the check valve 30B can be understood with regard to the following description of the check valve 30A. Each check valve 30 includes a housing 32 formed by walls 34. An interior surface of the walls 34 define an interior region 36. An inlet 38 and an outlet 42 are defined in the housing 32 for permitting fluid flow from an upstream side to a downstream side of the housing 32. An access port 44 is defined in housing 32 for permitting access to the interior region 36, and a flange 45 is formed around the access port 44 as described further below. A valve mechanism 46 is positioned within the interior region 36 for controlling fluid flow therethrough. In the illustrated embodiment, the valve mechanism 46 is a check valve. It is appreciated that various types of devices can be received within the interior region 36. By way of example and not limitation, the types of flow control devices that could be received within interior region 36 include the following: various types of valves including swing-type check valves, flow meters, sample collection devices, sensors for monitoring fluid qualities, flow control devices, flow restrictors, and combinations thereof. The valve mechanism 46 includes a valve seat 48 positioned in the interior region 36 of the valve housing 32, and a seal retainer 52 positioned in the interior region 36 downstream from the valve seat 48. The seal retainer 52 is mounted on a stem 54.

The stem 54 and the seal retainer 52 are axially movable away from the valve seat 48 in response to fluid flow from the inlet 38 to the outlet 42, i.e., in a downstream direction. The seal retainer 52 and the stem 54 are also axially movable toward the valve seat 48 in response to fluid flow from the outlet 42 to the inlet 38, i.e., in an upstream direction. The seal retainer 52 and the stem 54 are configured to be positioned in sealing engagement against the valve seat 48 in the absence of fluid flow. A plurality of springs 55 connect the stem 54 to the interior of the walls 34. The springs 55 are positioned in radial opposition to one another, and each spring 55 has one end pivotally connected to the valve seat 48 and another end pivotally connected to the stem 54. The springs 55 are configured to maintain the seal retainer 52 in sealing engagement with the valve seat 48 in the absence of fluid flow.

As can be seen in FIG. 1, the valve mechanism 46 is positioned within a cage 56 that is configured to be received by the interior region 36 through access port 44 and retained within region 36 by end cap 70A.

Figure 2:
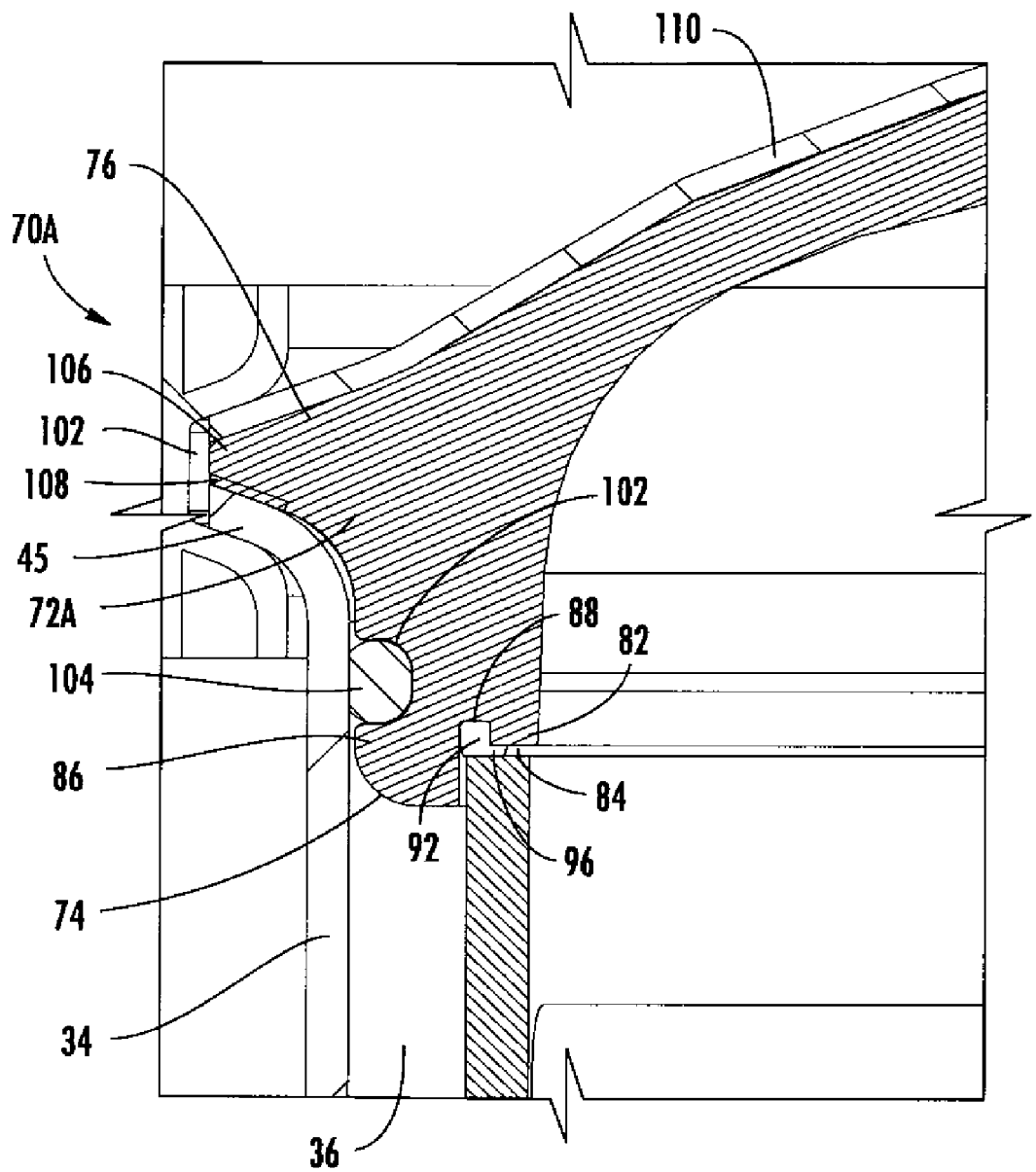
FIG. 2 is a partial sectional view of the check valve assembly and an end cap as shown in FIG. 1.

Referring to FIGS. 1 and 2, the end cap 70A is generally cup-shaped and includes an end cap core 72A and a metallic end cap cover 110. The end cap core 72A has an open end 74 and a closed end 76 and is configured such that the open end 74 can be received within the access port 44 of the check valve 30. The end cap core 72A is oriented such that the open end 74 is oriented such that it is open toward the valve mechanism 46. The end cap core 72A is generally cylindrical around an axis near the open end 74. An inner wall 82 is formed on the open end 74 and extends away from the open end 74 coaxial to the axis of the end cap core 72A. A land area 84 is formed on inner wall 82. An outer wall 86 is positioned concentrically with the inner wall 82 and extends from the end cap core 72A further than the inner wall 82. The inner wall 82 and the outer wall 86 together define an annular channel 88 that is configured to receive a gasket 92.

The gasket 92 is generally circular and has an outer ring portion configured to be received within the annular channel 88. An inner seal portion 96 extends from the ring portion of the gasket 92, and is configured to extend across the land area 84 of the inner wall 82. The inner wall 82, the outer wall 86, and the gasket 92 are configured such that the gasket 92 is operable to sealingly engage the cage 56 when the end cap 70A is positioned within access port 44.

Continuing to refer to FIGS. 1 and 2, a circumferential groove 102 is formed around the cylindrical portion of the end cap core 72A. In the illustrated embodiment, the circumferential groove 102 is spaced-away from the open end 74 of the end cap core 72A and from a rim 106 of the end cap core 72A (described below). It should be appreciated that the groove 102 could be formed on the outer wall 86 of the end cap core 72A. The groove 102 is configured to receive an o-ring 104. In one embodiment, the o-ring 104 is formed of a resilient polymeric material such as EPDM. The o-ring 104 could also be formed of suitable sealing materials such as buna-N, silicone rubber, Viton™, and the like.

The end cap core 72A flares outwardly to the rim 106 at a closed end 76 that is positioned opposite the open end 74. The rim 106 extends around the entire circumference of the end cap core 72A and has two opposed recesses 108 formed therein that are dimensioned to receive a tool such as a screw driver. In the illustrated embodiment, the closed end 76 is generally dome-shaped and extends away from the interior region 36. It should be appreciated that the closed end 76 could be generally flat or formed such that it extends into the interior region 36 of housing 32.

In the illustrated embodiment, the end cap core 72A is formed of a polymeric material. By way of example and not limitation, the end cap core 72A can be formed of one of Noryl™, a polysulfone, an acetal, a metal, a ceramic or a combination thereof.

Figure 3:
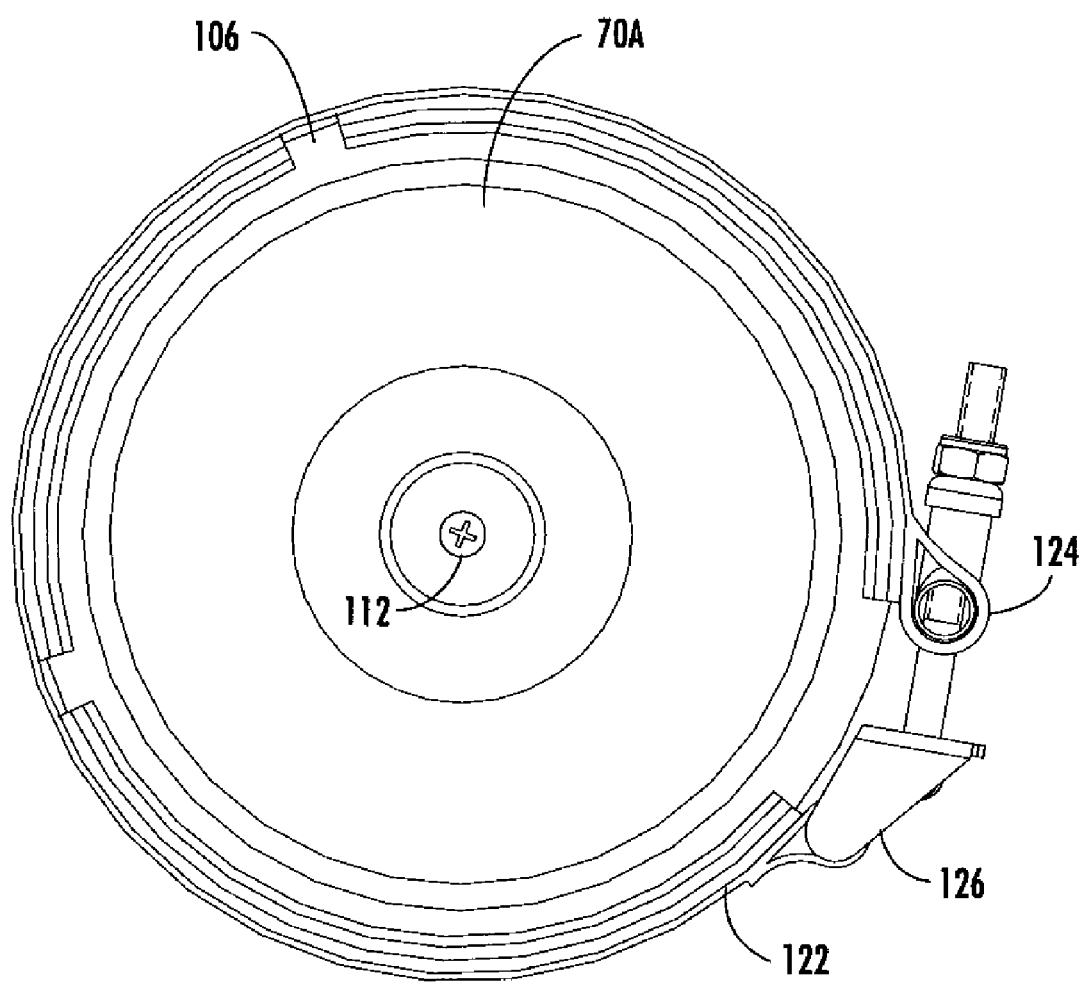
FIG. 3 is a top view of the end cap shown in FIG. 2.
Figure 4:
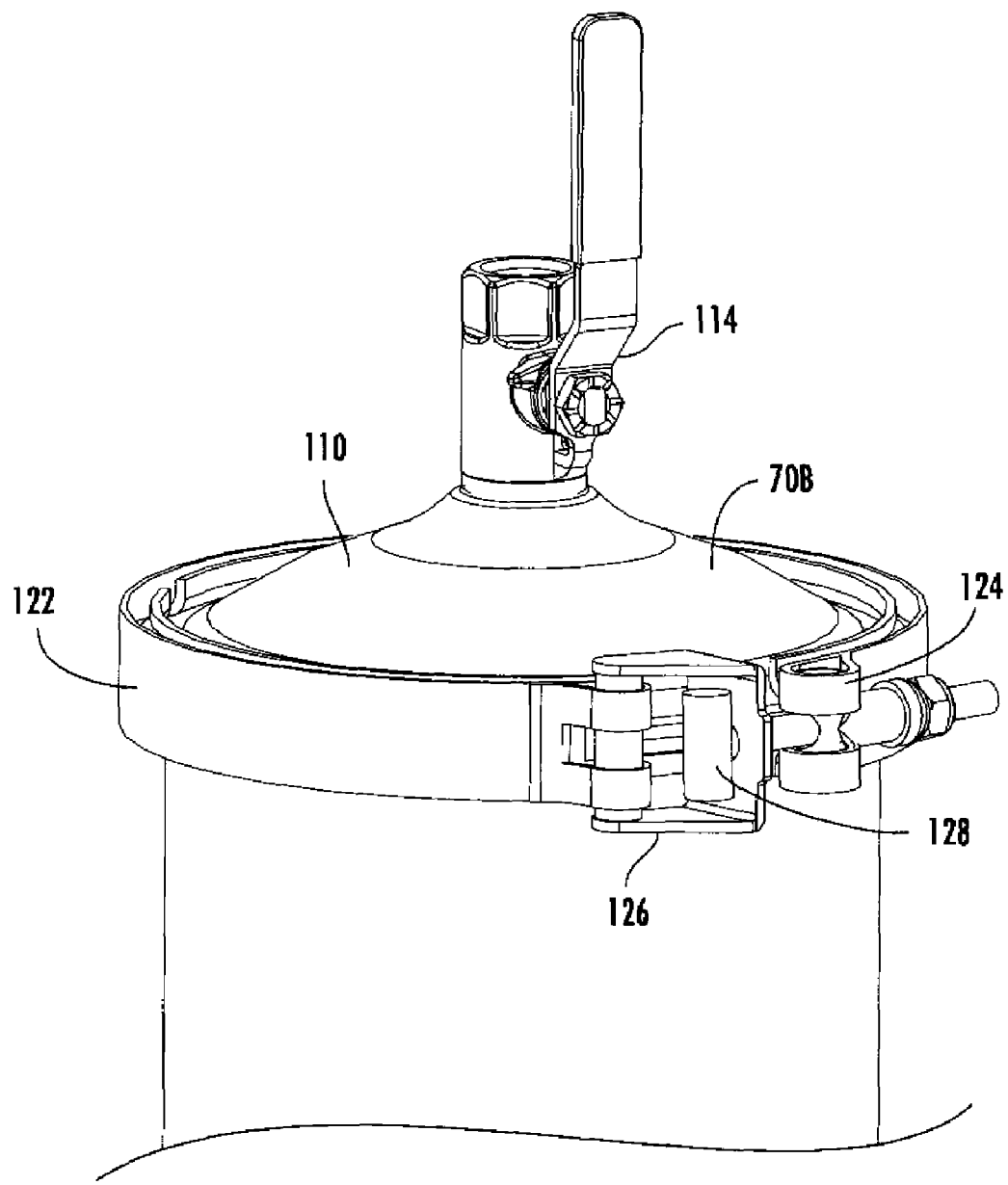
FIG. 4 is a perspective view of an end cap according to another embodiment of the present invention having a valve positioned therein.
Figure 5:
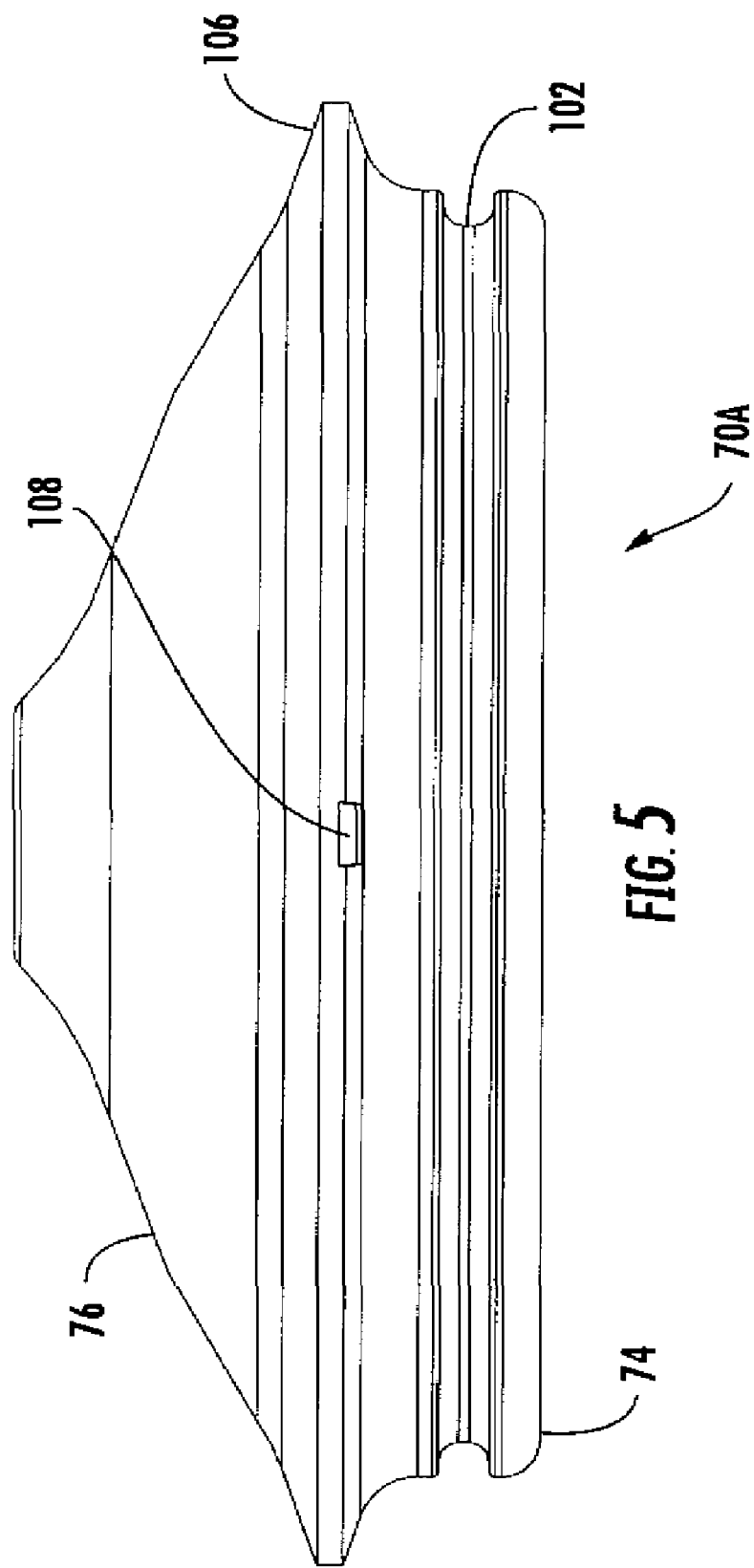
FIG. 5 is a side view of the end cap shown in FIG. 2.
Figure 6:
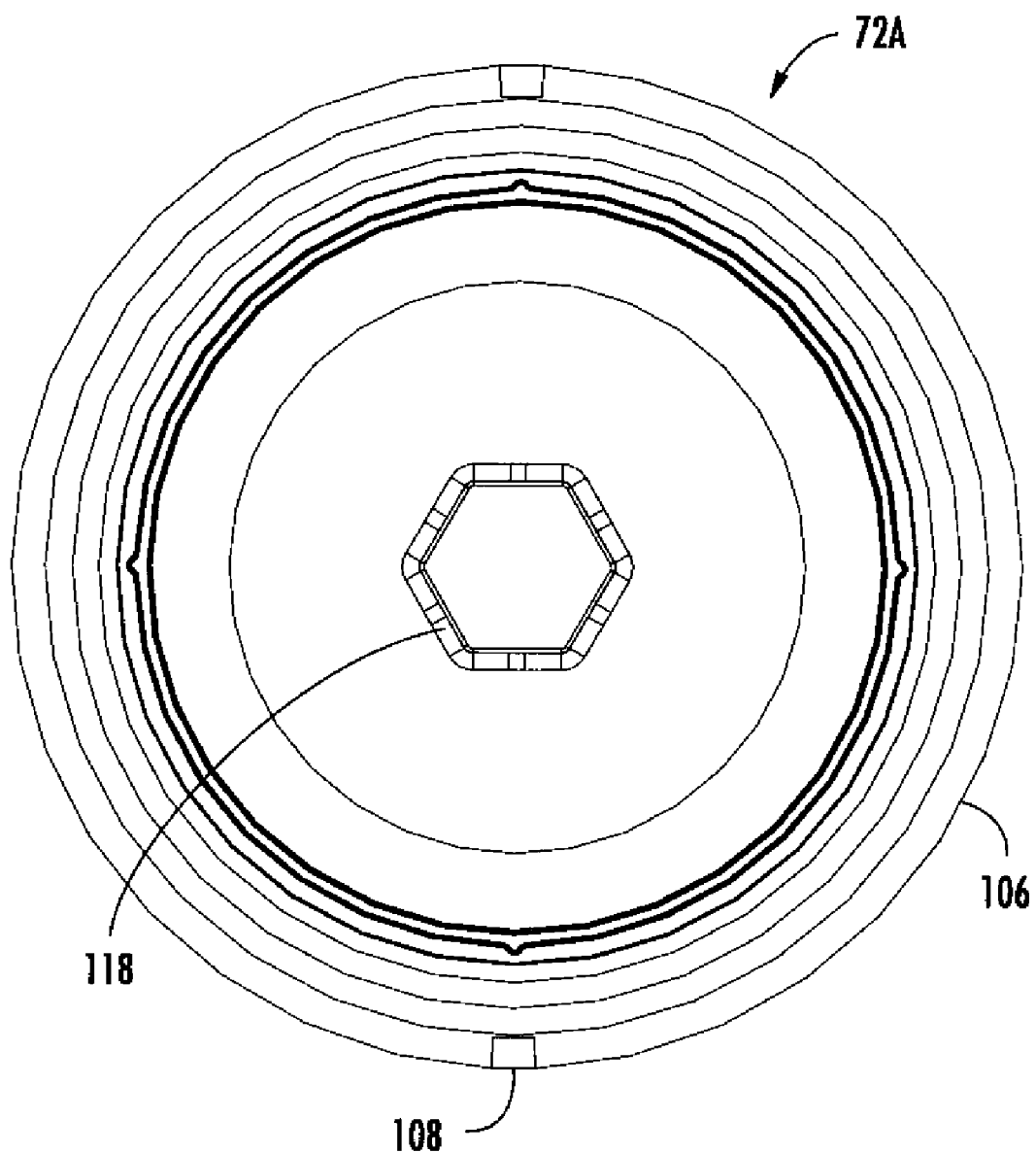
FIG. 6 is a top view of the end cap shown in FIG. 2.

The end cap cover 110 is configured to fit over the closed end 76 of the end cap core 72A. In the illustrated embodiment, the end cap cover 110 closely conforms to the shape of the closed end 76. As shown in FIG. 3, a screw 112 is provided to attach the end cap cover 110 to the end cap core 72A in one embodiment. Referring to an alternative configuration shown in FIG. 4, a test cock 114 is attached to the end cap core 72 B of the end cap 70B. A nut 116 is engaged with a portion of the test cock 114 that extends through the end cap cover 110, and is received within a recess 118 formed in the end cap core 72B and shown in FIG. 6. Respective portions of the test cock 114 and the end cap core 72B are configured to capture the end cap cover 110 and to retain it against the end cap cover 110. It should be appreciated that some embodiments of the present invention do not include an end cap cover 110. In some embodiments end cap cover 110 is integrally formed with end cap 70.

Referring now to FIG. 3, a clamp 122 is configured to capture the end cap 70A and a flange 45 formed around the access port 44. The clamp 122 is generally circular and has a first end 124 and a second end 126. A groove 102 is formed on the interior of the clamp 122 and is configured to receive rim 106 of the end cap 70A. A pin 128 is repositionably attached to first end 124 and is configured to engage second end 126 such that clamp 122 can be quickly secured around the flange 45 of the access port 44 and the rim 106 of the end cap 70. In this manner, end cap 70 can be attached to housing 32 of the check valve 30.

The present invention can be better understood from a description of the operation of end cap 70. As indicated above, end cap 70 is used to seal openings in pipes, fixtures, or tubes such as the access port 44. Prior to placing end cap 70 within access port 44, an o-ring 104 is positioned with in groove 102 and a gasket 92 is positioned within channel 88. In the illustrated embodiment, the valve mechanism 46 is positioned within cage 56 that is then placed within interior region 36 through access port 44. After cage 56 and valve mechanism 46 are positioned within interior region 36, end cap 70 is positioned such that open end 74 extends through access port 44 and o-ring 104 is in sealing engagement with walls 34. As indicated above, o-ring 104 is formed of a material that is deformable for providing a sealing engagement between end cap 70 and walls 34. When the end cap 70 is positioned within the access port 44, the lip 106 is near the flange 45 of the access port 44.

The clamp 122 is then place around end cap 70 and access port 44 such that both the flange 45 and the lip 106 are captured within channel 88. The pin 128 is engaged with second end 126 such that clamp 122 is secured around the flange 45 of the access port 44 and the rim 106 of the end cap 70. In this manner, end cap 70 is attached to housing 32 of the check valve 30.

The foregoing has described an end cap sealing system for an check valve. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. An end cap sealing system for sealing an open piping end, wherein the end cap sealing system comprises:
    (a) an end cap that includes;
        (i) an end cap core having a generally cylindrical end with a circumferential groove formed around the exterior thereof and having a closed end that defines a generally circular rim; and
        (ii) an o-ring positioned within the groove for sealingly engaging an interior wall of the open piping end;
    (b) a generally circular clamp having a channel formed therein for capturing the rim and a flange formed on the open piping end; and
    (c) wherein the o-ring is spaced-apart from the rim, the open piping end is formed on a fixture, the fixture is a check valve and the open piping end is an access port.

2. The end cap sealing system according to claim 1, wherein the flange is formed around the access port and defines a surface that engages the lip of the end cap.

3. The end cap sealing system according to claim 1, wherein the end cap includes a polymeric end cap core.

4. The end cap sealing system according to claim 3, further comprising a metallic end cap cover.

5. The end cap sealing system according to claim 4, wherein the end cap cover is attached to the end cap core by a screw.

6. The end cap sealing system according to claim 4, wherein the end cap cover is attached to the end cap core by a valve having a portion that extends through the end cap core.

7. A method for sealing an open piping end, comprising the steps of:
    (a) providing an end cap that includes an end cap core having a generally cylindrical end with a circumferential groove formed around the exterior thereof and having a closed end that defines a generally circular rim; and an o-ring positioned within the groove for sealingly engaging an interior wall of then open piping end; a generally circular clamp having a channel formed therein for capturing the rim and a flange formed on the open piping end; wherein the o-ring is spaced-apart from the rim;
    b) positioning the end cap within an open pipe end such that the o-ring engages the interior wall of the open pipe end and the rim is near a flange formed at the open end of piping; and
    c) positioning a generally circularly clamp such that a channel formed in the clamp captures the rim and a flange formed at the open piping end;
    d) wherein the open piping end is formed on a fixture, the fixture is a check valve and the open piping end is an access port.

8. The end cap sealing system according to claim 7, wherein the flange is formed around the access port and defines a surface that engages the lip of the end cap.

9. The end cap sealing system according to claim 7, wherein the end cap includes a polymeric end cap core.

10. The end cap sealing system according to claim 9, further comprising a metallic end cap cover.

11. The end cap sealing system according to claim 10, wherein the end cap cover is attached to the end cap core by a screw.

12. The end cap sealing system according to claim 11, wherein the end cap cover is attached to the end cap core by a valve having a portion that extends through the end cap core.

13. An end cap sealing system for sealing an of a check valve, wherein the end cap sealing system comprises:
    (a) an end cap that includes;
        (i) an end cap core having a generally cylindrical end with a circumferential groove formed around the exterior thereof and having a closed end that defines a generally circular rim; and
        (ii) an o-ring positioned within the groove for sealingly engaging an interior wall of the open piping end;
    (b) a generally circular clamp having a channel formed therein for capturing the rim and a flange formed on the check valve; and
    (c) wherein the o-ring is spaced-apart from the rim, the end cap includes a polymeric end cap core and the end cap sealing system further comprises a metallic end cap cover.

* * * * *